US009288796B1

(12) United States Patent
Oroskar

(10) Patent No.: US 9,288,796 B1
(45) Date of Patent: *Mar. 15, 2016

(54) ACTIVE-SET MANAGEMENT BASED ON AN ASSOCIATED CODEC

(71) Applicant: Sprint Spectrum L.P., Overland Park, KS (US)

(72) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/312,507

(22) Filed: Jun. 23, 2014

Related U.S. Application Data

(63) Continuation of application No. 13/693,934, filed on Dec. 4, 2012, now Pat. No. 8,798,622.

(51) Int. Cl.
*H04W 72/00* (2009.01)
*H04W 72/04* (2009.01)
*H04W 36/00* (2009.01)
*H04W 60/00* (2009.01)

(52) U.S. Cl.
CPC ...... *H04W 72/0406* (2013.01); *H04W 36/0005* (2013.01); *H04W 60/00* (2013.01); *H04W 72/04* (2013.01)

(58) Field of Classification Search
CPC ............ H04W 72/04; H04W 72/0406; H04W 36/0005; H04W 60/00
USPC .................. 455/450, 452.2, 509, 414.1, 456.1
See application file for complete search history.

(56) References Cited

U.S. PATENT DOCUMENTS

| | | | |
|---|---|---|---|
| 8,626,154 B1 * | 1/2014 | Oroskar | H04W 8/02 455/432.1 |
| 8,798,622 B1 * | 8/2014 | Oroskar | 455/435.1 |
| 2002/0163908 A1 | 11/2002 | Lakaniemi et al. | |
| 2006/0268783 A1 | 11/2006 | Julian et al. | |
| 2008/0207253 A1 * | 8/2008 | Jaakkola | H04B 17/345 455/550.1 |
| 2009/0239536 A1 | 9/2009 | Fallgren et al. | |
| 2010/0210246 A1 | 8/2010 | Yang et al. | |
| 2012/0250538 A1 | 10/2012 | Su et al. | |
| 2012/0302261 A1 * | 11/2012 | Tinnakornsrisuphap | G01S 5/0226 455/456.4 |

* cited by examiner

*Primary Examiner* — Khai M Nguyen

(57) ABSTRACT

Embodiments may involve the adjustment of the way in which coverage areas are included in the active set of a wireless communication device (WCD), based on the codec that is currently associated with the WCD. An illustrative method involves a radio access network (RAN): (a) determining a codec that is associated with a WCD; (b) using the associated codec as a basis for determining a value for at least one active-set parameter for the WCD; and (c) sending a message to the WCD, wherein the message indicates the determined value for the at least one active-set parameter.

18 Claims, 5 Drawing Sheets

ACTIVE-SET MANAGEMENT BASED ON AN ASSOCIATED CODEC

RELATED APPLICATION

This patent application is a continuation of U.S. patent application Ser. No. 13/693,934, filed on Dec. 4, 2012, the contents of which are entirely incorporated herein by reference, as if fully set forth in this application.

BACKGROUND

To provide cellular wireless communication service, a wireless service provider or "wireless carrier" typically operates a radio access network (RAN) that defines one or more coverage areas in which WCDs can be served by the RAN and can thereby obtain connectivity to broader networks such as the public switched telephone network (PSTN) and the Internet. A typical RAN may include one or more base transceiver stations (BTSs) (e.g., macro network cell towers and/or femtocells), each of which may radiate to define a cell and cell sectors in which WCDs can operate. Further, the RAN may include one or more base station controllers (BSCs) (which may also be referred to as radio network controllers (RNCs)) or the like, which may be integrated with or otherwise in communication with the BTSs, and which may include or be in communication with a switch or gateway that provides connectivity with one or more transport networks. Conveniently with this arrangement, a cell phone, personal digital assistant, wirelessly equipped computer, or other wireless communication device (WCD) that is positioned within coverage of the RAN can then communicate with a BTS and in turn, via the BTS, with other served devices or with other entities on the transport network.

Wireless communications between a WCD and a serving BTS in a given coverage area will typically be carried out in accordance with one or more agreed air interface protocols that define a mechanism for wireless exchange of information between the WCD and BTS. Examples of such protocols include CDMA (e.g., EIA/TIA/IS-2000 Rel. 0, A (commonly referred to as "IS-2000" or "1xRTT"), EIA/TIA/IS-856 Rel. 0, A, or other version thereof (commonly referred to as "IS-856", "1xEV-DO", or "EVDO")), iDEN, WiMAX (e.g., IEEE 802.16), LTE, TDMA, AMPS, GSM, GPRS, UMTS, or EDGE, and others now known or later developed.

The air interface protocol will generally define a "forward link" encompassing communications from the BTS to WCDs and a "reverse link" encompassing communications from WCDs to the BTS. Further, each of these links may be structured to define particular channels, through use of time division multiplexing, code division multiplexing (e.g., spread-spectrum modulation), frequency division multiplexing, and/or some other mechanism. The forward link, for example, may define (i) a pilot channel on which the RAN may broadcast a pilot signal to allow WCDs to detect wireless coverage, (ii) system parameter channels (e.g., a sync channel) on which the RAN may broadcast system operational parameters for reference by WCDs so that the WCDs can then seek network access, (iii) paging channels on which the RAN may broadcast page messages to alert WCDs of incoming communications, and (iv) traffic channels on which the RAN may transmit bearer traffic (e.g., application data) for receipt by WCDs. And the reverse link may define, for example: (i) access channels on which WCDs may transmit "access probes" such as registration messages and call origination requests, and (ii) traffic channels on which WCDs may transmit bearer traffic for receipt by the RAN.

In a conventional CDMA wireless network compliant with the IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When a WCD operates in a given sector, communications between the WCD and the BTS of the sector are carried on a given frequency and are encoded by the sector's PN offset and a given Walsh code.

Wireless service providers typically design their wireless networks to comprise a number of partially-overlapping wireless coverage areas. As a WCD that is subscribed to a wireless service provider moves about, the wireless network may hand off the WCD from one wireless coverage area to another. A goal of performing such handoffs is to provide a substantially continuous wireless coverage to the WCD, so that any communication sessions conducted by the WCD are not dropped or degraded due to loss of wireless coverage. Further, to facilitate handoffs, a WCD may have an "active set" of coverage areas (e.g., sectors) that it can be handed off to.

In another aspect, for certain types of communication, such as voice calls, video calls, and/or other types of calls, a WCD may be able to use two or more different types of codecs when engaging in such communication. However, each codec may have different characteristics that impact the extent of resources used when the WCDs are communicating.

OVERVIEW

In an exemplary embodiment, a wireless communication device (WCD) may support various types of codecs. These codecs may define how media content (e.g., voice, music, still images, and/or video) are encoded and decoded. Different codecs may have different features. For instance, a voice codec used by a WCD might encode and decode digital voice at a rate of 1 to 15 kilobits per second. However, to achieve these bit rates, some of the information present in an input analog voice signal (e.g., high-frequency spectral components) may be lost when digitized. Thus, codec design can be a tradeoff between achieving a low bit rate for a particular type of media (which is desirable to conserve network and storage capacity) and the user-perceived quality of the media produced by the codec, which typically improves as more bandwidth is utilized.

Herein, a characterization of the quality provided by a codec should be understood to indicate the quality of the media produced by that codec. For instance, a "high-quality codec" should be understood as being a codec that generally produces media of a higher quality (as compared to some other codec that generally produces media of a lower quality).

There may be various scenarios where a radio access network (RAN) assigns a codec to a given WCD, such as during call setup and/or when paging a WCD. When the RAN assigns a codec, the RAN may select from two or more different codecs that are supported by the given WCD. Since wireless spectrum is limited, it may benefit wireless network operators to allocate wireless resources judiciously, and codec selection and assignment is an opportunity to do so. Therefore, when multiple codecs are supported by a particular WCD, a RAN may be configured to consider various factors when determining which codec to assign to the WCD, such as factors indicating the utilization of network resources in the sector where the WCD is located.

It may be desirable for a WCD not to be handed off from a coverage area where it currently is assigned, or is likely to be assigned, a high-quality codec. Accordingly, exemplary embodiments may involve a RAN and/or a WCD managing a WCD's active set with this purpose in mind. (Of course, it should be understood that this purpose is not limiting, and exemplary embodiments may be implemented with other purposes in mind.)

For example, certain parameters may affect the number of coverage areas that are included in a WCD's active set and/or the ease with which a coverage area can be added to and/or removed from the active set, may in turn affect the probability of the WCD being handed off. Herein, such parameters may be referred to as "active-set parameters." Accordingly, an exemplary embodiment may involve a RAN and/or a WCD adjusting active-set parameters so as to reduce the probability of a handoff when the WCD is associated with a higher-quality codec. On the other hand, a RAN and/or a WCD may adjust active-set parameters so as to increase the probability of a handoff when the WCD is associated with a lower-quality codec, in hopes that the WCD will be assigned a higher-quality codec in a different coverage area.

In one aspect, an exemplary method involves a RAN: (a) determining a codec that is associated with a WCD, (b) using the associated codec as a basis for determining a value for at least one active-set parameter for the WCD, and (c) sending a message to the WCD, wherein the message indicates the determined value for the at least one active-set parameter.

In another aspect, an exemplary RAN system may include a non-transitory computer-readable medium and program instructions stored on the non-transitory computer-readable medium. The program instructions may be executable by at least one processor to: (a) determine a codec that is associated with a wireless communication (WCD), (b) use the associated codec as a basis to determine a value for at least one active-set parameter for the WCD, and (c) send a message to the WCD, wherein the message indicates the determined value for the at least one active-set parameter.

These and other aspects and advantages will become apparent to those of ordinary skill in the art by reading the following detailed description, with reference where appropriate to the accompanying drawings. Further, it should be understood that the foregoing overview is merely for purposes of example and is not intended to limit the scope of the invention as claimed.

BRIEF DESCRIPTION OF THE DRAWINGS

An exemplary embodiment of the present invention is described herein with reference to the drawings, in which.

DETAILED DESCRIPTION

Figure 1:
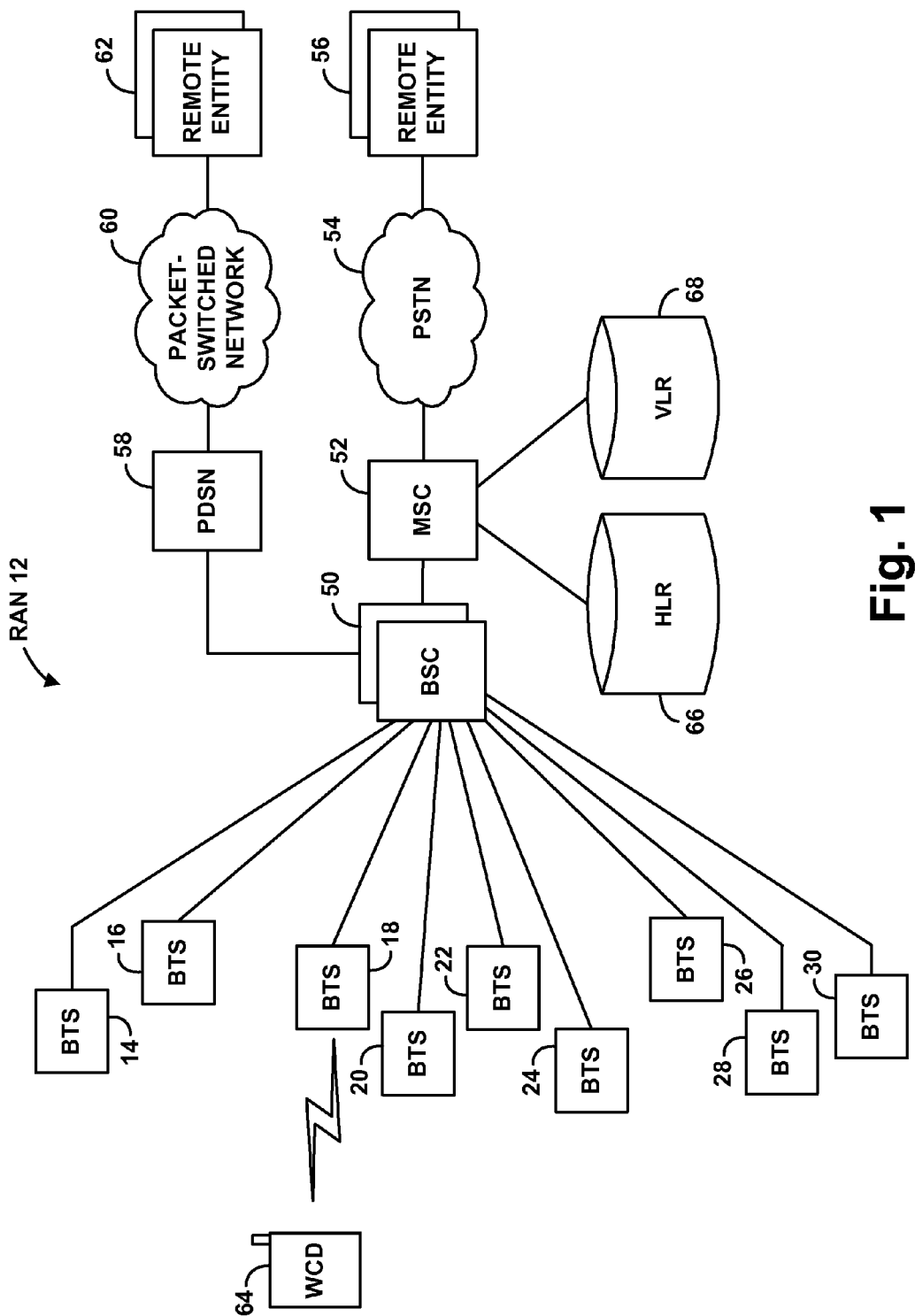
FIG. 1 is a simplified block diagram of a wireless communication network, according to an exemplary embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

It should be noted that the term "handoff" is to be interpreted broadly herein. Thus, a WCD being "handed off" from a one wireless coverage area to another wireless coverage area may include scenarios in which: (i) the WCD is participating in communication via a first coverage area when a handoff to another coverage area occurs, (ii) the WCD is not participating in communication via a first wireless coverage area when the handoff occurs, and (iii) the WCD is engaged in a call via a first coverage area, the first call is terminated, and soon after the WCD engages in a second call via a second coverage area.

I. EXEMPLARY COMMUNICATION NETWORKS

Referring to the drawings, as noted above, FIG. 1 is a simplified block diagram of a wireless communication network in which an exemplary method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium (i.e., data storage, rather than a mere signal), to achieve, for instance, the useful, concrete, and tangible result of helping to improve the paging success rate in an access network.

As shown in FIG. 1, the exemplary network includes at its core a radio access network (RAN) 12 that radiates to define numerous coverage areas in which wireless communication devices (WCDs) can engage in RF communication with the RAN. The RAN may define these coverage areas discretely through use of directional antennas and/or by various modulation parameters, including, without limitation, carrier frequencies and PN offsets or other parameters, depending on the air interface protocol used. Example air interface protocols include CDMA (e.g., IS-95, IS-2000, 1×RTT, 1×EV-DO, etc.), iDEN, WiMAX, TDMA, AMPS, GSM, GPRS, UMTS, EDGE, LTE, WI-FI (e.g., 802.11), BLUETOOTH, and others now known or later developed. In practice, the coverage areas may overlap to some extent, so that a served WCD can move seamlessly from one coverage area to another.

As shown, the RAN may include numerous base stations (also known as base transceiver stations or BTSs), designated in the figure as base stations 14-30 and one or more base station controllers 50 (which may be integrated with one or more of the base stations). The base stations preferably include directional antennas, power amplifiers, and associated transceiver equipment arranged to establish corresponding wireless coverage areas to communicate with WCDs in those coverage areas. The coverage areas can be cell sites, cell sectors, or some other defined wireless coverage area (possibly even a combination of coverage provided by multiple base stations).

Each base station controller may be coupled with one or more switches, such as a mobile switching center (MSC) 52, which provides connectivity with the public switched telephone network (PSTN) 54, so that served WCDs can communicate with remote entities 56 on the PTSN. Additionally or alternatively, each base station controller may be coupled with one or more gateways, such as packet data serving node (PDSN) 58, which provides connectivity with a packet-switched network 60, so that served WCDs can communicate with remote entities 62 on the packet-switched network.

In general, a RAN 12 may take various forms and may include any of a variety and number of components, depending for instance on the air interface protocol employed by the RAN. As such, the RAN 12 may vary in degree of complexity, from a simple wireless access point router to a more complex system such as that shown for instance. Further, it should be understood that actions that are generally described as being carried out by the RAN (or simply by the "network" or a "wireless communication network") may be carried out by various different entities or combinations of entities in the RAN, possibly in conjunction with other entities in communication with the RAN. It should also be understood that features and functionality described in reference to one network entity or combination of entities, such as a BTS, BSC, MSC, and/or PDSN, may also be carried out by other entities without departing from the scope of the invention. Yet further, note that the combination of BTS 104 and BSC 106 may be considered a base station. However, BTS 104 or BSC 106 could, taken alone, be considered a base station as well. Additionally, a base station may be considered to be either or both of those devices, and perhaps make use of one or more functions provided by an MSC, a PDSN, and/or any other entity.

FIG. 1 depicts a representative WCD 64 by way of example, which could be a cell phone, wirelessly equipped personal digital assistant (PDA), or any other type of wirelessly-equipped device now known or later developed. The WCD is preferably equipped with hardware, software, and/or other logic to communicate with RAN 12 in accordance with an agreed communication protocol, such as one of the protocols noted herein for instance. For example, in an exemplary embodiment, WCD 64 includes a wireless communication interface that functions to facilitate air interface communication with RAN 12 according to one or more protocols such as those noted above. Further, WCD may include a user interface, which typically includes components for receiving input from a user of WCD and providing output to a user of the WCD. Yet further, WCD 64 may include program logic stored in data storage (e.g., one or more volatile and/or non-volatile storage components of the WCD, such as magnetic, optical, or organic storage components) and executable by one or more processors (e.g., general purpose and/or special purpose processors) to carry out various functions described herein.

Each WCD, such as WCD 64, typically has at least one associated identifier that uniquely identifies the WCD. By way of example, a WCD may have a unique mobile directory number (MDN), a unique International Mobile Subscriber Identity (IMSI), a unique MAC address, or some other identifier dynamically or statically assigned to the WCD, which may serve as its address for receiving air interface communications transmitted to it by the RAN. As a specific example, an IMSI is a unique number associated with the WCD, typically taking the form of the WCD's phone number. Additionally or alternatively, each WCD may be assigned a mobile identification number (MIN).

To keep track of where WCDs, such as WCD 64 are operating, a RAN 12 may include a visitor location register (VLR) 68 and a home location register (HLR) 66, as shown in FIG. 1. VLR 68 may include information related to WCDs that are currently being served by MSC 52, while HLR 66 may include information related to all WCDs that utilize RAN 12.

In a further aspect, each WCD may have a service profile stored in the HLR 66 and/or in the VLR 68 that corresponds to the MSC 52 that is currently serving a WCD 64. Each MSC 52 may be coupled to the HLR 66 and or its VLR 68 by an out of band signaling network such as a Signaling System #7 (SS7) network, for instance, and may thus access the service profile for a WCD using an identifier for the WCD, such as its MIN, MDN, and/or IMSI.

VLR 68 and/or HLR 66 may obtain information regarding the locations of WCDs through registration messages that the WCDs transmit at various times. For example, a WCD might transmit a registration message that identifies its current cell-sector when the WCD first powers-up, at regular time intervals thereafter (e.g., every 10 minutes), and in response to other triggers (such as moving a certain distance or moving into a different paging zone). These registration messages could be received by VLR 68 and HLR 66. In this way, VLR 68 and HLR 66 may maintain location for each WCD in its service area (which could be, for VLR 68, the area served by MSC 52 and, for HLR 66, all areas served by RAN 12). The location information for a WCD could include an identification of the cell-sector that the WCD reported in its most recent registration message and the date/time of the most recent registration message. HLR 66 and/or VLR 68 could also maintain other types of location information for WCDs.

II. EXEMPLARY RAN COMPONENT

Figure 2:
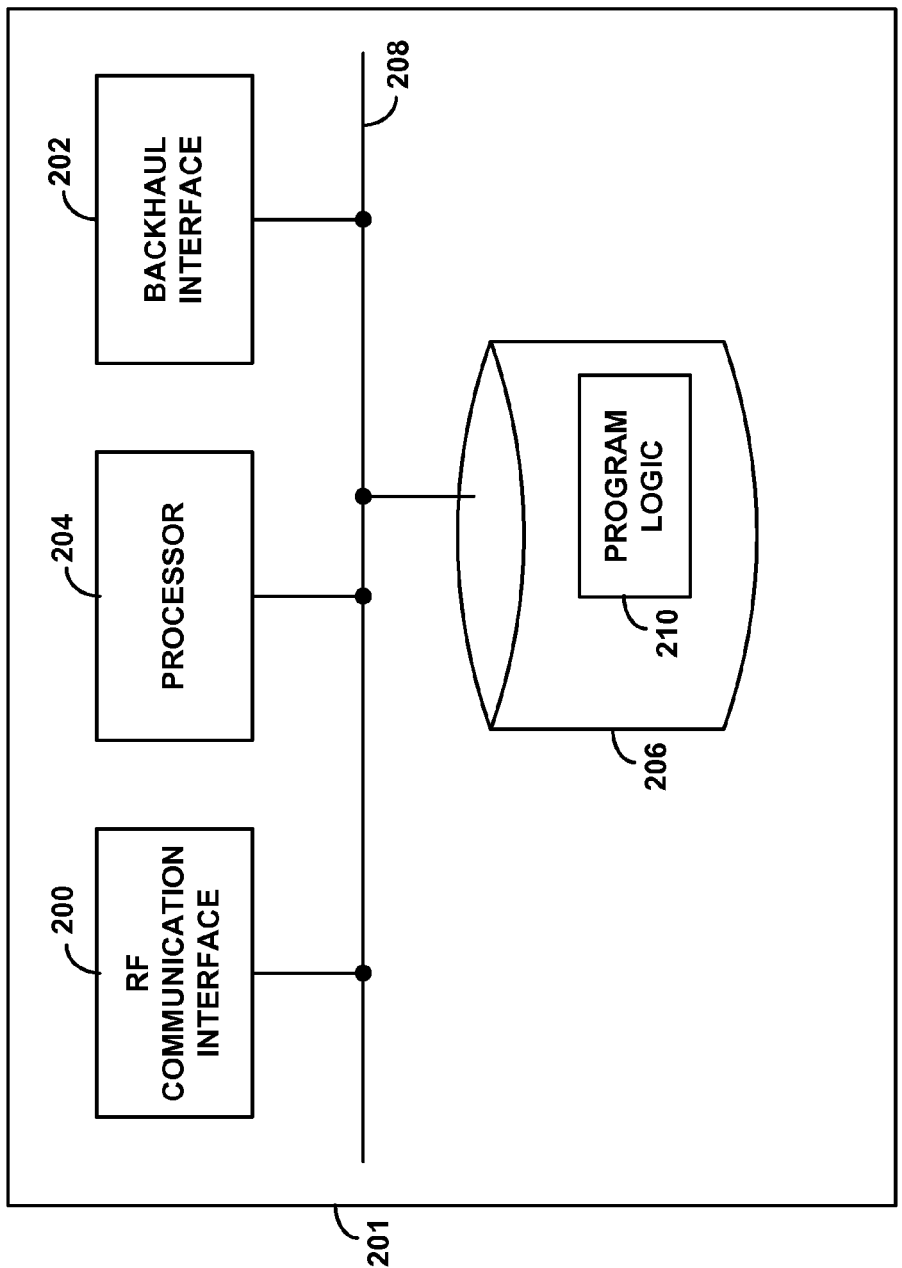
FIG. 2 is a simplified block diagram showing functional components of a radio-access-network component, according to an exemplary embodiment.

FIG. 2 is a simplified block diagram showing functional components of a RAN component 201, according to an exemplary embodiment. RAN component 201, which could be a base station or a switch, for example, or could take another form. As shown, the RAN component 201 may include an RF communication interface 200, a backhaul interface 202, a processor 204, and data storage 206, all of which may be communicatively linked together by a system bus, network, or one or more other connection mechanisms 208.

In practice, RAN component 201 may take the form of or include one or more BTS and/or a BSC, such as BTSs 18-24 and/or BSC 50 for instance, or may take the form of a switch, such as MSC 52. Accordingly, the illustrated components of RAN component 201 (e.g., communication interface 200, a backhaul interface 202, a processor 204, and data storage 206) may be distributed and/or subdivided between one or more BTSs, a BSC, and/or an MSC, or may be implemented in a single BTS, a single BSC, or a single MSC. It should be understood that an exemplary system may also take the form of another network entity or combinations of other network entities, without departing from the scope of the invention. Further, an exemplary system may be implemented in or provided in communication with a base station (or implemented in or provided in communication with any other network entity or entities arranged to carry out analogous functions).

In RAN component 201, RF communication interface 200 may comprise one or more antenna structures, one or more power amplifiers, and associated equipment, for engaging in RF communication with WCDs operating within the base station's coverage, according to one of the air interface protocols noted above for instance. Backhaul interface 202 may comprise any sort of communication link or mechanism enabling the base station to exchange signaling and bearer data with other RAN entities, such as with MSC 52 for instance. Processor 204 may comprise one or more processors (e.g., general purpose and/or special purpose processors), such as microprocessors for instance. And data storage 206 may comprise one or more volatile and/or non-volatile storage components, such as magnetic, optical, or organic storage components, integrated in whole or in part with processor 204. As further shown, data storage 206 preferably contains program logic 210 (e.g., machine language instructions) executable by processor 204 to carry out various functions, such as the functionality of the exemplary methods and systems described herein.

III. EXEMPLARY CODECS

A RAN 12 and/or a WCD 64 may use various types of codecs to encode and/or decode a voice call and/or other types of communications. A codec may encode an analog or digital stream of information (e.g., voice, video, still images, music, data, and so on) for transmission and/or storage. For example, a source WCD may include a voice codec that receives a spoken utterance from a user, and encodes this utterance according to a particular format. The source WCD may then transmit the encoded utterance to a destination WCD. The destination WCD may include the same (or a similar) voice codec to decode the utterance from the particular format so that the destination WCD can play out the resulting signal.

In general, there may be a roughly linear relationship between codec bit rate and the media quality (e.g., the voice quality) that the codec produces at that bit rate. For example, a voice codec operating at 9.6 kilobits per second is likely to produce better quality voice than a voice codec operating at 4.8 kilobits per second. However, as codec technologies advance, new codecs may be introduced that are capable of supporting equal or better media quality at a lower bit rate. Thus, in some cases, a voice codec that operates at 8.5 kilobits per second may produce better voice quality than the voice codec operating at 9.6 kilobits per second. Furthermore, some voice codecs are capable of supporting multiple different encoding rates, and perhaps even switching between these rates dynamically to adapt to the characteristics of the input signal and/or to achieve a target bit rate.

In order to further illustrate these aspects of codecs, several different voice codecs are compared and contrasted below. In an exemplary embodiment, CDMA wireless networks may use one or more codecs from the Enhanced Variable Rate Codec (EVRC) family.

For instance, the EVRC-A codec operates on input speech signals sampled with 16-bit resolution 8,000 times per second (i.e., a sampling rate of 8,000 Hz). The resulting 128 kilobit per second stream is divided into 20 millisecond frames, each of which is compressed to either 171 bits (8.55 kilobits per second), 80 bits (4.0 kilobits per second), or 16 bits (0.8 kilobits per second). EVRC-A may also be referred to as CMDA service option 3.

The EVRC-B codec also operates on input speech signals sampled with 16-bit resolution 8,000 times per second, and supports the three compressed bit rates supported by EVRC-A. However, EVRC-B also supports a compressed frame size of 40 bits (2.0 kilobits per second). Additionally, EVRC-B supports eight operating points, each defining a target bit rate. When configured to operate at one of these operating points, EVRC-B may attempt to achieve the desired bit rate by switching between two or more of the supported frame sizes. EVRC-B may also be referred to as CMDA service option 68.

The EVRC-WB codec is a "wideband" variation of EVRC-B. Particularly, EVRC-WB operates on input speech signals sampled with 16-bit resolution at 8,000 or 16,000 times per second. When sampling at the rate of 8,000 times per second, frames encoded with EVRC-WB can be compatible with EVRC-B encodings. When sampling at 16,000 times per second, frames encoded with EVRC-WB are 171 bits (8.55 kilobit per second). However, unlike the 171 bit frames produced when sampling at 8,000 times per second, the EVRC-WB frames include high-frequency components from the 3.5 kHz to 7 kHz range. Thus, at the same bit rate, EVRC-WB may be capable of producing higher quality voice calls than EVRC-A or EVRC-B. Additionally, EVRC-WB supports two of the operating points of EVRC-B, and also supports a mode for improved encoding of non-speech signals, such as music-on-hold. EVRC-WB may also be referred to as CMDA service option 70.

The EVRC-NW codec, which may also be referred to as CMDA service option (SO) 73, supports some of the encodings of both EVRC-B and EVRC-WB. Particularly, EVRC-NW supports the sampling rates and frame sizes of EVRC-WB. Also, EVRC-WB supports seven of the operating points of EVRC-B, and also supports the mode for improved encoding of non-speech signals. Thus, EVRC-NW is fully compatible with EVRC-WB, and supports more operating modes of EVRC-B than EVRC-WB.

To support both EVRC-B and EVRC-WB, EVRC-NW includes eight capacity operating points (COPs), which may be referred to as EVRC-NW COP 0 to COP 7, or simply as COP 0 to COP 7. Under EVRC-NW, COP 0 is a rate 1 wideband voice encoder. Further, EVRC-NW COP 4 is a narrowband voice encoder as defined under EVRC-B. EVRC-NW COPs 1 to 3 are narrowband voice encoders that provide higher voice quality as compared to EVRC-B, with COP 1 providing the greatest improvement over EVRC-B. Further, EVRC-NW COPs 5 to 7 are narrowband voice encoders that provide lower voice quality as compared to EVRC-B, with COP 5 being the closest to EVRC-B in quality.

In an exemplary embodiment, a RAN 12 may be configured to determine which codec or codecs are supported by a given WCD, and to assign one of the supported codecs to the WCD to use for a given communication. The RAN 12 may determine the codec or codecs that are supported by a particular WCD in various ways. For example, when a WCD 64 originates a call, the WCD 64 may transmit an origination message to the RAN 12. This origination message may include an indication of the service options supported by the WCD 64. For instance, the origination message may include the WCD's preferred service option (e.g., service option 73) as well as one or more auxiliary service options (e.g., service option 3 and/or service option 68) that the WCD also supports.

Further, for a WCD receiving a call (e.g., a callee WCD), the RAN may store or have access to a profile that includes indications of the service options supported by the WCD. This profile may also specify the WCD's preferred service option as well as one or more auxiliary service options that the WCD also supports. Thus, for an incoming call to a callee WCD, the RAN may receive an indication that a call has arrived at the RAN for the callee WCD, access the profile of the callee WCD to determine the supported codecs, and based on various factors discussed in more detail below, determine which codec to assign to the callee WCD for the call.

In some embodiments, the HLR and/or the VLR may indicate the service option capabilities for individual WCDs that have registered with the RAN. For example, the HLR and/or VLR may indicate that a particular WCD is configured for SO 73. In an exemplary embodiment, this may be interpreted as implying that the particular WCD is capable of using any of COP 1 to COP 7, and that a base station (e.g., a BTS), may negotiate whether the particular WCD is capable of COP 0 (i.e., HD Voice).

As such, before a BTS 18 pages a WCD 64 for a voice call, the BTS may coordinate with its serving MSC to access the VLR and determine which service options are supported by the WCD 64. Further, when a WCD that supports EVRC-NW (i.e. SO 73) acknowledges a page by sending the RAN 12 a page response message, the WCD may also indicate the particular operating points that are supported by the WCD in the page response message.

In an exemplary embodiment, a BTS may consider various factors when determining which codec should be assigned to a WCD for a given call. For example, in some embodiments, the BTS may consider the utilization of at least part of the RAN infrastructure. If the utilization of a wireless coverage area serving the WCD, a wireless coverage area that is likely to serve the WCD, a BTS, a BSC, and/or a backhaul link between any RAN and/or non-RAN components is too high, it may be preferable to instruct the WCD to use a codec with a lower expected bit rate, such as EVRC-A or EVRC-B. However, if this utilization—or utilizations—is not too high, it may be preferable to allow the WCD to use a codec that supports a higher expected bit rate, and thereby potentially increasing the media quality of the call. In this latter case, the BTS may instruct the WCD to use a codec with a higher expected bit rate, such EVRC-NW COP 0 or COP 1.

Once the RAN (e.g., a BTS) has assigned a codec to a WCD to use for a call, the RAN may notify the WCD of the assigned codec. For example, according to SO 73, a base station may send the WCD a Service Option Control message that includes the particular operating point that is assigned to the WCD for the call (e.g., one of COP 0 to COP 7). Other examples are also possible.

In some embodiments, a RAN may attempt to assign EVRC-NW COP 0 to all WCDs that support COP 0, unless the utilization of network resources in a coverage area is too high. This may be done in an effort to provide WCDs with the best call quality that is possible, and/or for other reasons. In the event that the utilization is too high, then the RAN may select a codec that provides lower quality, such as one of EVRC-NW COPs 1 to 7.

Determining whether the utilization is "too high" may be based on one or more utilization thresholds. For instance, the RAN may measure the utilization of a wireless coverage area serving the WCD and compare the measured utilization to a utilization threshold. If the measured utilization exceeds the utilization threshold, the RAN may instruct the WCD to use EVRC-B. Otherwise, the RAN may instruct the WCD to use EVRC-WB or EVRC-NW. The utilization threshold may be represented as a percentage, such as 30%, 40%, 50%, 60%, 70%, and so on.

It should be understood that the codecs described herein are only examples. Other voice or non-voice codecs may be used instead.

IV. EXEMPLARY HANDOFF FUNCTIONALITY

In an exemplary RAN 12, a WCD 64 may be in communication with one or more wireless coverage areas simultaneously, even if the WCD is only actively using one of these wireless coverage areas to communicate.

Receiving signals from multiple wireless coverage areas simultaneously may provide advantages for a WCD. For instance, doing so allows the WCD to keep track of neighboring wireless coverage areas that are candidates for a handoff. Regularly, or from time to time, the WCD may measure the strength of the signals received from each wireless coverage area. These signals may be received on a traffic channel, a paging channel, or some other type of channel, and the measurements may involve determining the signal-to-noise ratio (SNR) and/or the frame error rate (FER) of the signals.

When a WCD is served by a given wireless coverage area and determines that the signal strength the WCD received from this given wireless coverage area has dropped below a signal-strength threshold, the WCD may request a handoff from the given wireless coverage area to a new wireless coverage area from which the WCD has received a higher signal strength. The WCD may also request a handoff to a new wireless coverage area when the received signal strength of the new wireless coverage area exceeds that of the given wireless coverage area by some amount. As a result of measuring this received signal strength and using these measurements to influence handoff behavior, continuity of wireless service may be improved. For instance, the WCD may be handed off from the given wireless coverage area before it experiences a poor signal strength from the given wireless coverage area that substantially compromises the WCD's ability to communicate.

In an exemplary embodiment, a WCD 64 may be configured to maintain an "active set" that can include multiple sectors (with each included sector being referred to as an "active sector"). A WCD 64 may monitor the signal strength of the active sectors, as well as other sectors that are not in its active set, so that it can request that sectors be added to and/or dropped from the active set.

The RAN may provide a WCD 64 with settings for parameters that help the WCD determine when to request that sectors be added to and/or dropped from its active set. For instance, under IS-2000, a base station may provide a WCD the following parameters, which relate to pilot signal strength and are used by the WCD to maintain its active set:

T_ADD: Threshold pilot strength for addition to the active set (e.g., −14 dB).
T_COMP: Threshold difference in signal strength from an active set pilot (e.g., 2 dB).
T_DROP: Threshold pilot strength for removal from the active set (e.g., −16 dB).
T_TDROP: Time for which an active set pilot falls below T_DROP to justify removal from the active set (e.g., 2 seconds).

The base station also provides the WCD with a Neighbor List Update Message (NLUM), which identifies the "neighbor" sectors, which are not in the active set, but have been identified as candidates for the active set.

The WCD 64 then scans for all of the pilot signals from the sectors in its active set, and measures the received signal strength for each. For example, WCD 64 may calculate Ec/Io for each sector in the active set, where Ec is energy per chip and Io is the total power received. If the pilot signal strength of any neighbor sector exceeds T_ADD, the WCD 64 adds the pilot to its "candidate" set and sends a Pilot Strength Measurement Message (PSMM) to the base station with the estimated Ec/Io for the pilot and information indicative of the identity of the sector.

Further, if the pilot strength exceeds the strength of any active-sector signal by T_COMP (and possibly also depending on current capacity and other issues), then the base station may send a Handoff Direction Message (HDM) to the WCD, listing the pilot as a new member of the active set. Upon receipt of the HDM, the WCD 64 then adds the pilot to its active set as instructed, and the WCD sends a Handoff Completion Message (HCM) to the base station (e.g., to BTS 108), acknowledging the instruction, and providing a list of the pilots (PN offsets) in its active set. Depending on system configuration, the WCD may also identify pilot signals from the remaining set of sectors that exceed the thresholds. It should be understood that each active sector in the active set is represented by its corresponding PN offset, and that references to an active sector may also be considered to refer to the PN offset of the active sector.

Similarly, if the WCD 64 detects that the signal strength of a pilot in its active set drops below T_DROP, the WCD starts a handoff drop timer. If T_TDROP passes, the WCD then sends a PSMM to the base station, indicating the Ec/Io and drop timer. The base station may then respond by sending an HDM to the WCD, without the pilot in the active set. The WCD would then receive the HDM and responsively move the pilot to its neighbor set and send an HCM to the base station.

Under IS-2000, a WCD 64 may continually scan its active sectors, neighbor sectors, and candidate sectors in a cyclical manner, according to a schedule under which active sectors are scanned twice as frequently of neighbor sectors, and neighbor sectors in turn are scanned twice as frequently as candidate sectors. The details of this scanning process are generally known to those skilled in the art, and thus not discussed in further detail herein. Further, when the WCD 64 is engaged in IS-2000 communications, WCD 64 typically decodes transmissions using all the PN offsets in its active set, together with the respective Walsh codes assigned for each PN-identified sector. Then, on a frame-by-frame basis, the WCD may select a sector from its active set from which to receive forward-link traffic.

In a further aspect, a WCD 64 and/or a RAN 12 may be configured to manage the active set of a WCD 64 using a number of techniques.

For instance, an exemplary WCD 64 may be configured vary the maximum number of active sectors that are permitted in the active set by updating a maximum-active-sector parameter, which indicates the maximum number of active sectors that are allowable in the active set. As an example, the WCD may by default set a maximum-active-sector parameter to three, in which case up to three sectors may be included in the active set and scanned as active sectors. However, the WCD 64 may adjust the maximum number of active sectors by setting the maximum-active-sector parameter to six, for instance, in which case up to six sectors may be included in its active set. Other adjustments to the maximum number of active sectors are also possible.

Further, the RAN 12 may determine a value for the maximum-active-sector parameter of a particular WCD 64, and then send an instruction to the WCD 64, which indicates that the WCD 64 should adjust its maximum-active-sector parameter accordingly. As such, a WCD 64 may be configured to adjust its maximum-active-sector parameter upon being instructed to do so by the RAN.

Note that there is no requirement that a WCD actually include the maximum number of active sectors in its active set. This maximum number should therefore be understood as a constraint on the active set, but not necessarily a requirement. As such, it is possible that, at a given point in time, less than the maximum number of sectors meet the criteria for the active set, and as a result, less than the maximum number of sectors will be included in the active set.

In addition or in the alternative to adjusting the maximum-active-sector parameter, an exemplary WCD may be configured to adjust a number of parameters affecting whether a sector is included in the active set, either alone or in combination with each other. For example, a WCD 64 and/or a RAN 12 may be configured to adjust the value of T_ADD, T_COMP, T_DROP, and/or T_TDROP in an effort, for example, to change the probability that a WCD will add a given sector to its active set and/or to change the probability that an active sector is kept in the active set. Further, the RAN 12 may be configured to determine a value for each of one or more of T_ADD, T_COMP, T_DROP, and/or T_TDROP, which should be used to manage a given WCD's active set. In the event that the RAN 12 determines that a WCD 64 should adjust one or more such parameters, the RAN 12 may send an instruction to the WCD 64 which indicates how the WCD 64 should adjust such parameters.

To implement some or all of the above functionality (and other mobile-station functionality described herein), an exemplary RAN component may include a tangible computer-readable medium with program instructions stored thereon, which are executable by a processor to carry out the various functions described herein. For example, an exemplary base station or switch may include program instructions that are executable to: (a) determine a codec that is associated with a wireless communication (WCD), (b) use the associated codec as a basis to determine a value for at least one active-set parameter for the WCD, and (c) send a message to the WCD, wherein the message indicates the determined value for the at least one active-set parameter. Other examples are also possible.

Additionally or alternatively, to implement some or all of the above functionality (and other mobile-station functionality described herein), an exemplary WCD may include a tangible computer-readable medium with program instructions stored thereon, which are executable by a processor to carry out the various functions described herein. For example, an exemplary WCD may include program instructions that are executable to: (a) determine a codec that is assigned to the WCD, (b) use the assigned codec as a basis for determining a value for at least one active-set parameter for the WCD, wherein the at least one active-set parameter affects how many active sectors that are included in an active set of the WCD, and (c) manage the active set of the WCD according to the at least one active-set parameter.

V. EXEMPLARY RAN-IMPLEMENTED METHODS

An exemplary method may be carried out by a RAN component in an effort to reduce the likelihood of a handoff when the WCD is assigned a higher-quality codec, or, conversely, in an effort to increase the likelihood of the WCD handing off when the WCD has been assigned a higher-quality codec. In particular, the WCD may a codec that was last-assigned, or that is about to be assigned, to the WCD, and then use this codec as a basis for managing the active set of the WCD. An exemplary method may be carried out for other reasons as well, without departing from the scope of the invention.

Figure 3:
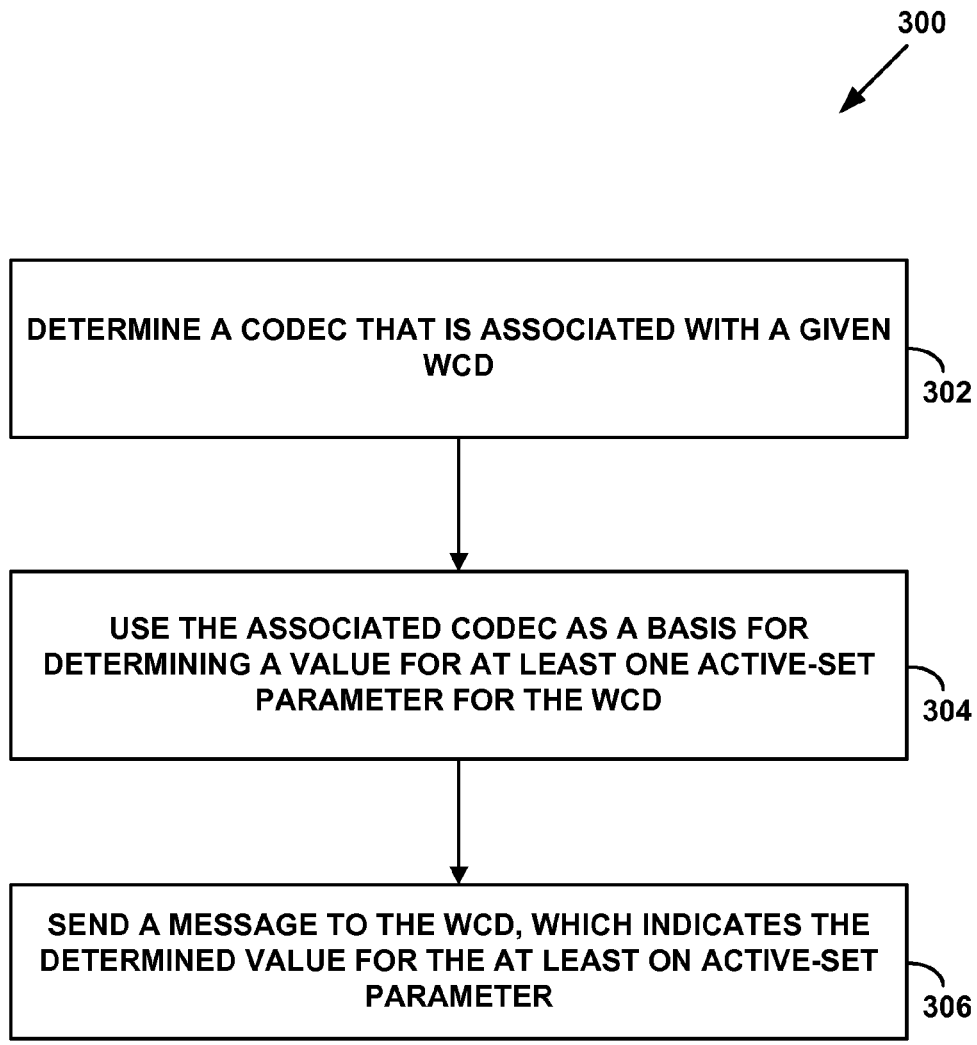
FIG. 3 is a flow chart illustrating a method 300 that may be implemented by a radio access network, according to an exemplary embodiment.

For example, FIG. 3 is a flow chart illustrating a method 300 that may be implemented by a RAN, according to an exemplary embodiment. It should be understood that references herein to RAN performing various functions, such as those of method 300, encompass a component of a RAN, such as a base station or an MSC, carrying out the various functions. Further, an exemplary method or portions thereof may be carried out by another entity or a combination of entities, without departing from the scope of the invention.

According to method 300, the RAN determines a codec that is associated with a given WCD, as shown by block 302. The RAN may then use the associated codec as a basis for determining a value for at least one active-set parameter for the WCD, as shown by block 304. The RAN can then send a message to the WCD, which indicates the determined value for the at least on active-set parameter, as shown by block 306.

A. Determining the Codec that is Associated with a Device i. Determining the Last-Assigned Codec In some embodiments, block 302 may involve the RAN determining the codec that was last assigned to the WCD, which may be referred to as the last-assigned codec. More specifically, if the WCD was recently assigned a certain codec in a coverage area, it may be taken as an indication that the WCD is more likely to be assigned that codec for a new call in that coverage area. Accordingly, if the last-assigned codec for a WCD in a certain coverage area provides for a higher-quality voice call, then this may be interpreted as an indication that the WCD is likely to be assigned a higher-quality codec for a new call. Accordingly, the RAN may apply less concatenation (or possibly no concatenation) to a page to a WCD for a new call, if the last-assigned codec for the WCD was a high-quality codec, and vice versa. By doing so, the RAN may increase the likelihood that a page is successful, when there is a greater likelihood that the target WCD will be assigned a higher-quality codec.

In a further aspect, a RAN may also consider the "staleness" of the last-assigned codec when determining the value for the at least one active-set parameter. More specifically, if less time has elapsed between the assignment of the last-assigned codec and a page to establish a new call, then the last-assigned codec may be considered a better indicator of the codec that is likely to be assigned for the new call. Accordingly, block 306 may involve the RAN using the elapsed time since the assignment of the last-assigned codec as a further basis for determining the value for the at least one active-set parameter. For example, the RAN may only change the value of an active-set parameter when the elapsed time is less than a threshold period of time. On the other hand, if the elapsed time is greater than the threshold period of time, then the RAN may simply use a default value for the active-set parameter.

In some embodiments, some or all of method 300 may be carried by a base station in a RAN. In order to determine the codec that was last assigned to a given WCD, at block 302, a base station may reference a codec database that is maintained by or otherwise accessible to the base station. For example, a base station can maintain a codec database that indicates the last-assigned codec or codecs for particular WCDs in particular coverage areas. Accordingly, whenever a base station instructs a WCD to use a certain operating point under EVRC-NW, the BTS may store a record of the operating point that is assigned to the WCD (e.g., one of EVRC-NW COPs 0 to 7), as well as an indication of the coverage area (e.g., the cell ID or sector ID) in which the operating point that is assigned to the WCD. Thus, before base station pages a WCD, the base station may access the codec database to determine the last-assigned codec for the WCD in the coverage area where the base station is about to page the WCD.

In a further aspect of some embodiments, base stations may be configured to send indications of codecs that are assigned to their respective serving switches, so that the switches can readily determine the last assigned codec for a given WCD. In particular, when a base station assigns a codec to a WCD, the base station may send a message to its serving switch that indicates the WCD to which the codec was assigned, the specific codec that was assigned to the WCD, and possibly other information, such as the time of assignment. The switch may then update the VLR and/or the HLR with this information. For example, the VLR and/or HLR may include last-assigned-codec data that indicates, on a per-WCD basis, one or more codecs that were most recently assigned to each WCD (and the order in which the codecs were assigned, if multiple codecs are indicated for a given WCD). Additionally or alternatively, the last-assigned-codec data for a given WCD may indicate the most recently assigned codec in each of two or more coverage areas. Accordingly, the switch may access the VLR and/or the HLR to determine the last-assigned codec for a WCD, possibly on a per-coverage-area basis.

ii. Determining the Currently-Assignable Codec

In some embodiments, block 302 may involve the RAN determining a codec that is currently assignable to the WCD in a given coverage area. For instance, method 300 may be implemented by a RAN during a call origination process or during a call, when a switch or a base station is about to assign or has just assigned a codec to the WCD for the call. In such an embodiment, block 302 may simply involve the RAN assigning a codec to a WCD based at least in part on network utilization in the coverage area where WCD is connected for the call and/or based on other factors. Method 300 may then be carried out to update at least one active-set parameter based on the assigned codec.

In particular, during a call-origination process, a RAN may determine a codec to assign to a WCD that is involved in the call, as shown by block 302. The WCD may be, for example, the WCD that initiated the call (e.g., a source WCD), or a WCD to which the call is being directed (e.g., a target WCD). The RAN may then use the codec as a basis for determining a value for at least on active-set parameter for the WCD, as shown by block 804. Further, the RAN may send a message to the WCD, which indicates the determined value for the at least one active-set parameter, as shown by block 306.

Note, however, that the RAN does not need to determine the currently-assignable codec during a call origination process or an ongoing call. Rather, in some embodiments, the RAN may determine a currently assignable codec even when there is no codec assigned or about to be assigned to a WCD. For instance, RAN may determine a codec that would be assigned to a WCD if, for example, a call were to be initiated at that time. To do so, the RAN may select a codec in the same way it would if it were assigning a codec to the WCD (e.g., based on network utilization), but refrain from actually assigning the codec.

B. Determining Active Set Parameter(s) for a WCD Based on the Associated Codec

In some embodiments, block 304 may involve the RAN determining a value for a maximum-active-sector parameter. For instance, on an exemplary embodiment, the RAN may decrease the value of the maximum-active-sector parameter for higher-quality codecs, and increase the value of the maximum-active-sector parameter for lower-quality codecs.

By reducing the maximum number of active sectors when the WCD is assigned a higher-quality codec, the RAN may reduce the likelihood of the WCD handing off to another coverage area, where it might be assigned a lesser-quality codec. Conversely, by increasing the maximum number of active sectors when the WCD is assigned a lower-quality codec, the RAN may increase the likelihood of the WCD handing off to another coverage area, where it might be assigned a higher-quality codec In some embodiments, there may be a number of different codecs that are available for the RAN to assign to a WCD, which include at least a first and a second codec. Further, the first codec may provide for higher-quality voice service as compared to the second codec. More specifically, if the WCD is associated with the first codec, then the RAN may set the value of the maximum-active-sector parameter equal to a first value. If the WCD is associated with the second codec, then the RAN may set the value of the maximum-active-sector parameter equal to a second value. Further, since the first codec is of higher quality than the second codec, the second value may be greater than the first value. Thus, when the WCD is assigned the higher-quality codec, the WCD is accordingly instructed to set its maximum-active-sector parameter to the lower first value. Setting the maximum-active-sector parameter to the lower value may result in less sectors being included in the active set, and thus may decrease the probability that the WCD hands off from a sector where it is assigned a higher-quality codec, to another sector where it might be assigned a lower-quality codec.

As another example, consider again a scenario where there are a number of different codecs that are available for assignment to WCDs. In this case, the available codecs may include one or more first codecs, one or more second codecs, and one or more third codecs, where the one or more first codecs provide higher-quality voice service as compared to the one or more second codecs, and where the one or more second codecs provide higher-quality voice service as compared to the one or more third codecs. Thus, if the associated codec is one of the first codecs, then the RAN may set the value of the maximum-active-sector parameter to a first value. If the associated codec is one of the second codecs, then the RAN may set the value of the maximum-active-sector parameter to a second value that is greater than the first value. And, if the associated codec is one of the third codecs, then he RAN may set the value of the maximum-active-sector parameter to a third value that is greater than the second value.

In a specific implementation of the above example, the one or more first codecs may be EVRC modes 0 to 2, the one or more second codecs may be EVRC modes 3 to 4, and the one or more third codecs may be EVRC modes 5 to 7. Accordingly, the maximum-active-sector parameter may be set to a lower number of sectors when the associated codec is one of EVRC modes 0 to 2, than when the associated codec being is one of EVRC modes 3 to 7. Further, when the associated codec is one of EVRC modes 3 to 4, the maximum-active-sector parameter may be set to a higher number of sectors than when the associated codec is one of EVRC modes 0 to 2, but a lower number of sectors than when the associated codec is one of EVRC modes 5 to 7. For example, the maximum-active-sector parameter may be set equal to two for EVRC modes 0 to 2, may be set equal to four for EVRC modes 3 and 4, may be set equal to six for EVRC modes 5 to 7.

Additionally or alternatively, the active-set parameter or parameters that are determined by the RAN may include those that affect how likely a given sector is to be added to or kept in the active set (and thus ultimately may affect how many active sectors are in the active set). Such active-set parameters may include, but are not limited to, T_ADD, T_COMP, T_DROP, and/or T_TDROP. In an exemplary embodiment, the RAN may adjust one or more of these active-set parameters such that a given sector is more or less likely to be added to the active set and/or such that a given active sector is more or less likely to be kept in the active set. In particular, the RAN may decrease T_ADD and/or decrease T_COMP for a WCD, which may help to increase the probability that a given sector is added to the active set of the WCD. Additionally or alternatively, the RAN may decrease T_DROP and/or increase T_TDROP, which may help to increase the probability that a given sector is kept in a WCD's active set.

In an exemplary embodiment, method 300 may be implemented so as to take into consideration the quality of a WCD's associated codec, when helping to manage the active set of the WCD. In particular, the RAN may adjust T_ADD, T_COMP, T_DROP, and/or T_TDROP, so as to increase the probability that a new sector is added to a WCD's active set and/or that a given active sector is kept in the WCD's active set, when it is determined that the codec associated with the WCD is a higher-quality codec. Conversely, the RAN may adjust T_ADD, T_COMP, T_DROP, and/or T_TDROP so as to decrease the probability that a new sector is added to a WCD's active set and/or that a given active sector is kept in the WCD's active set, when it is determined that the codec associated with the WCD is a lower-quality codec.

Figure 4:
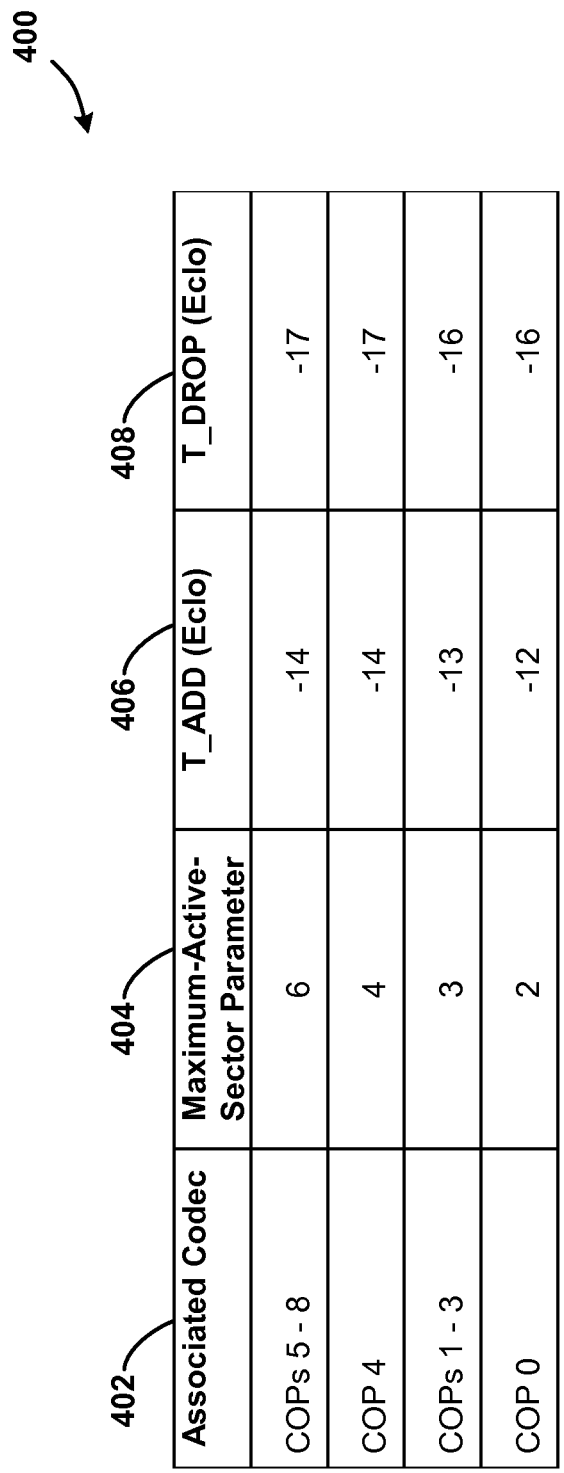
FIG. 4 shows a table that includes data indicating, for various codecs, a corresponding setting for a maximum-active-sector parameter, a corresponding T_ADD setting, and a corresponding T_DROP setting, according to an exemplary embodiment.

To illustrate an implementation of method 300, FIG. 4 shows a table 400 that includes data indicating, for various codecs 402, a corresponding setting for a maximum-active-sector parameter 404, a corresponding T_ADD setting 406, and a corresponding T_DROP setting 408. In this example, codecs 402 are identified by EVRC-NW COP values. Each maximum-active-sector parameter 402 indicates a maximum number of sectors that can be included in the WCD's active set. Further, T_ADD and T_DROP are indicated as the Ec/Io value at which a sector is eligible to be added to or dropped from the active set, respectively.

Once a RAN component (e.g., a base station or a switch) has determined the codec that is associated with a WCD, the RAN component may access data such as that stored in table 400 to determine the appropriate settings for one or more active-set parameters. In particular, if a RAN component determines that the associated codec is any of COP 5 to COP 8, then based on table 400, the RAN component will set the maximum-active-sector parameter equal to 4, set T_ADD equal to −14, and set T_DROP equal to −17. If, however, the WCD determines that the associated codec is COP 4, then this means there is a less of a need for the WCD to be handed off to another coverage area (where it would hopefully be assigned a higher-quality codec), than when the associated codec is any of COPs 5 to 8. Thus, if the RAN component determines that the associated codec is COP 4, then table 400 indicates that the maximum-active-sector parameter should be set to 4, that T_ADD should be set equal to −14, and that T_DROP should be set equal to −17. Thus, while T_ADD and T_DROP remain set in the same manner as for COPs 5 to 8, the maximum number of active sectors is reduced from 6 to 4.

Table 400 also indicates that the probability of a handoff should be reduced further for COPs 1 to 3, and even further for COP 0. In particular, the 50-70% range, and then below 50%. In particular, if the associated codec is any of COPs 1 to 3, then table 400 indicates that the maximum-active-sector parameter should be set to 3, that T_ADD should be set to −13, and that T_DROP should set to −16. And, if the associated codec is COP 0, then table 400 indicates that the maximum-active-sector parameter should be set to 2, that T_ADD should be set to −12, and that T_DROP should again be set to −16.

It should be understood that the specific codecs 402 and/or the corresponding values of the active-set parameters 404 to 408 may be vary without departing from the scope of the invention. Furthermore, it should be understood that the combination of active-set parameters shown in table 400 is but one example, and that similar data may be provided for other combinations of one or more active-set parameters without departing from the scope of the invention.

C. Sending the Message to Indicate Adjusted Active-Set Parameters

At block 306, the RAN may send various types of messages to indicate the determined value for the at least on active-set parameter. For example, the RAN may indicate the respectively-determined value for each of one or more active-set parameters in an overhead message, such as in the various types of overhead messages that a RAN routinely sends to a WCD that is operating in a coverage area of the RAN. The RAN could additionally or alternatively indicate the respectively-determined value for each of one or more active-set parameters in a system parameters message or a handoff direction message (HDM). The RAN could also indicate the respectively-determined value for each of one or more active-set parameters in other types of messages.

Note that a RAN may or may not send a message indicating the determined value(s) for active-set parameter(s), each time method 300 is performed. In particular, if method 300 is performed and the determined value(s) are no different than the value(s) that were already set for the particular WCD, then there may not be a need to indicate the newly-determined value(s) to the WCD. Accordingly, the RAN may refrain from explicitly indicating the newly-determined value(s) to the WCD. However, it is also possible that the RAN may send a WCD a message indicating the determined value(s) for active-set parameter(s), every time method 300 is performed on behalf of the WCD.

Note that in some instances, a RAN could locally update an active-set parameter that affects whether or not a given sector is included in the active set of a certain WCD, without explicitly sending a message to the WCD. Thus, block 306 might involve an implicit or indirect indication of the determined value for the at least on active-set parameter. For example, a RAN could adjust T_COMP locally, in which case block 306 might simply involve the RAN sending a Handoff Direction Message (HDM) to the WCD, listing the pilot of a sector that was added based on the adjusted T_COMP as a new member of the active set. Other examples are also possible.

VI. EXEMPLARY WCD-IMPLEMENTED METHODS

In some embodiments, a WCD may implement an exemplary method in order to manage its active set based on its assigned codec. For example, when a WCD receives a message indicating that it has been assigned a certain codec, the WCD may adjust one or more active-set parameters that affect the (possibly overriding settings that were determined and indicated to the WCD by the RAN).

Figure 5:
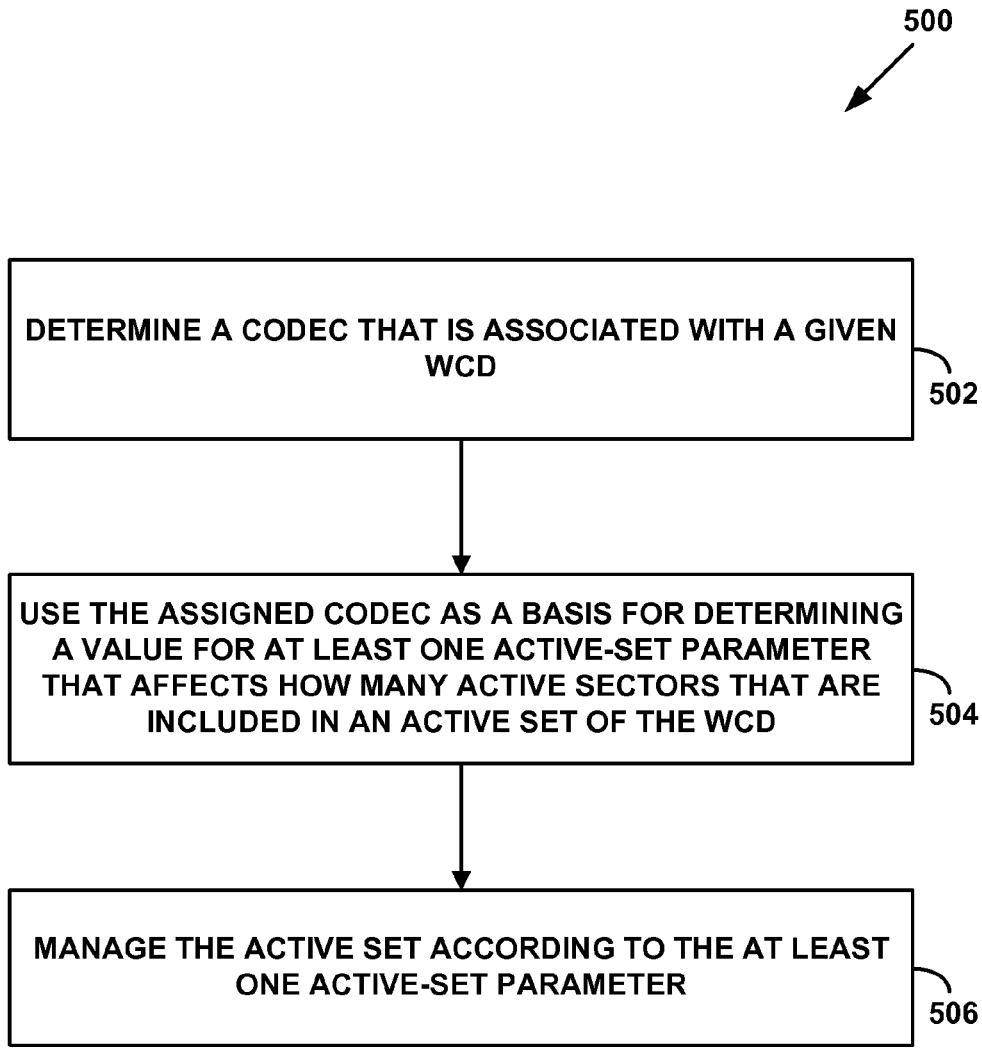
FIG. 5 is a flow chart illustrating a method that may be implemented by a wireless communication device, according to an exemplary embodiment.

FIG. 5 is a flow chart illustrating a method 500 that may be implemented by a WCD, according to an exemplary embodiment. More specifically, method 500 involves a WCD determining a codec that is assigned with the WCD, as shown by block 502. The WCD may then use the assigned codec as a basis for determining a value for at least one active-set parameter that affects how many active sectors that are included in an active set of the WCD, as shown by block 504. The WCD may then manage its active set according to the at least one active-set parameter, as shown by block 506.

In a further aspect, a WCD may responsively perform method 500 whenever it receives a message that assigns a codec to the WCD. However, a WCD may perform method 500 at other times, without departing from the scope of the invention.

Further, at block 504, the WCD may determine values for one or more of the same active-set parameters as described in reference to block 304 of method 300. And, at block 506, the WCD may manage its active set in various ways, such as those described herein.

VII. CONCLUSION

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

I claim:

1. A method comprising:
a radio access network (RAN) determining a codec that is associated with a wireless communication device (WCD);
using the associated codec as a basis for determining a value for at least one active-set parameter for the WCD, wherein determining the value for at least on active-set parameter comprises determining a value for at least one active-set parameter affecting whether or not a given sector is included in the active set; and
sending a message to the WCD, wherein the message indicates the determined value for the at least one active-set parameter.

2. The method of claim 1, wherein sending the message to the WCD comprises sending one of: (a) an overhead message, (b) a system parameters message and (c) a handoff direction message.

3. The method of claim 1, wherein the method is carried out by a base station in the radio access network.

4. The method of claim 1:
wherein determining the codec that is associated with the WCD comprises determining a codec that was last assigned to the WCD; and
wherein using the associated codec as a basis for determining the value for the at least one active-set parameter comprises using the last-assigned codec as a basis for determining the value for the at least on active-set parameter.

5. The method of claim 1, wherein determining a codec that is associated with the WCD comprises determining a codec that is currently assignable to the WCD in a given coverage area.

6. The method of claim 5, wherein the currently-assignable codec is determined based at least in part on network utilization in the given coverage area.

7. The method of claim 5, wherein the method is carried out by the RAN as part of a call-origination process, and wherein sending the message to the WCD comprises sending a call registration message to the WCD.

8. The method of claim 1, wherein using the determined codec as a basis for determining the value for at least on active-set parameter comprises determining, based at least in part on the determined codec, a value of a maximum-active-sector parameter for the WCD.

9. The method of claim 8, wherein a plurality of codecs that are available for assignment comprise at least a first and a second codec, wherein the first codec provides for higher-quality voice service as compared to the second codec, and wherein determining the value of a maximum-active-sector parameter for the WCD comprises:

if the WCD is associated with the first codec, then setting the value of the maximum-active-sector parameter to a first value; and if the WCD is associated with the second codec, then setting the value of the maximum-active-sector parameter to a second value, wherein the second value is greater than the first value.

10. The method of claim 8, wherein a plurality of codecs that are available for assignment, wherein the plurality of available codecs comprises one or more first codecs, one or more second codecs, and one or more third codecs, wherein one or more first codecs provide for higher-quality voice service as compared to the one or more second codecs, wherein the one or more second codecs provide for higher-quality voice service as compared to the one or more third codecs, and wherein determining the value of a maximum-active-sector parameter for the WCD comprises:

if the WCD is associated with one of the first codecs, then setting the value of the maximum-active-sector parameter to a first value;

if the WCD is associated with one of the second codecs, then setting the value of the maximum-active-sector parameter to a second value, wherein the second value is greater than the first value; and if the WCD is associated with one of the third codecs, then setting the value of the maximum-active-sector parameter to a third value, wherein the third value is greater than the second value.

11. The method of claim 10:

wherein the one or more first codecs comprise EVRC modes 0 to 2;

wherein the one or more second codecs comprise EVRC modes 3 to 4;

wherein the one or more third codecs comprise EVRC modes 5 to 7; and wherein the first value is 2, the second value is 4, and the third value is 6.

12. The method of claim 1, wherein determining the value for the at least one active-set parameter affecting whether or not a given sector is included in the active set comprises at least one of: (a) setting a value for at least one active-set parameter that affects a probability that a given sector will be added to the active set, (b) setting a value for at least one active-set parameter that affects a probability that a given active sector will be kept in the active set, and (c) setting a value for at least one active-set parameter that affects a probability that a given active sector will be dropped from the active set.

13. The method of claim 1, wherein determining the value for the at least one active-set parameter affecting whether or not a given sector is included in the active set comprises determining a value for each of one or more of: (a) a threshold pilot strength for addition to the active set (T_ADD), (b) a threshold difference in signal strength from an active set pilot (T_COMP), (c) a threshold pilot strength for removal from the active set (T_DROP), and (d) a time for which an active set pilot falls below T_DROP to justify removal from the active set (T_TDROP).

14. A radio-access-network system comprising:

a non-transitory computer-readable medium; and program instructions stored on the non-transitory computer-readable medium and executable by at least one processor to:

determine a codec that is associated with a wireless communication (WCD);

use the associated codec as a basis to determine a value for at least one active-set parameter for the WCD, wherein the at least one active-set parameter comprises at least one active-set parameter affecting whether or not a given sector is included in the active set of the WCD; and send a message to the WCD, wherein the message indicates the determined value for the at least one active-set parameter.

15. The system of claim 14, wherein the determined codec is a codec that was last assigned to the WCD.

16. The system of claim 14, wherein the determined codec is a codec that is currently assignable to the WCD in a given coverage area.

17. The system of claim 14, wherein the at least one active-set parameter for the WCD comprises a maximum-active-sector parameter for the WCD.

18. A method comprising:

a wireless communication device (WCD) determining a codec that is assigned to the WCD;

using the assigned codec as a basis for determining a value for at least one active-set parameter for the WCD, wherein the at least one active-set parameter affects how many active sectors that are included in an active set of the WCD; and managing the active set of the WCD according to the at least one active-set parameter.

* * * * *